3,383,375
TREATMENT OF POLYPROPYLENE ARTICLES
Anne K. van der Vegt, Willy H. J. Badrian, and Engelbert A. de Groot, Delft, Netherlands, assignors to Shell Oil Company, New York, N.Y., a corporation of Delaware
No Drawing. Filed May 14, 1963, Ser. No. 280,450
Claims priority, application Netherlands, May 18, 1962, 278,575
7 Claims. (Cl. 260—93.7)

The invention relates to a process for the improvement of the impact strength of shaped articles made from polypropylene or mixtures predominantly consisting of polypropylene, and also to the shaped articles with improved impact strength obtained by this process.

Polypropylene is a thermoplastic material which can be prepared by a known process by polymerization of propylene at comparatively low pressures with the aid of Ziegler-Natta catalysts (usually known as low-pressure polymerization catalysts), and because of its favorable properties, especially its low density, high melting point and good mechanical properties and workability, it has recently become increasingly important. It is accordingly being used to an increasing extent for the manufacture of all types of shaped articles such as piping, bottles, plates, dishes, cups, mugs, containers and other utility articles. Conventional molding techniques such as extrusion methods, injection molding, vacuum-forming, blowing and the like are used for manufacturing these articles.

Although most of the properties of polypropylene are superior to those of polyethylene, its impact strength is inferior. While the impact strength of both the conventional low density branched polyethylene and the newer high density linear polyethylene is satisfactory in every respect, that of polypropylene is undesirably low, especially at low temperatures. This is particularly the case with polypropylene with a high content of isotactic material. If the temperature is reduced from, say 20° C. to 0° C., the impact strength of polypropylene usually decreases so rapidly and the brittleness increases to such an extent that polypropylene becomes less suitable or even entirely useless for certain applications such as the manufacture of bottles and other articles which are subjected to jolts and shocks in use, particularly at low temperatures.

With shaped articles made from polypropylene it has further been found that in many cases the impact strength decreases considerably with time after manufacture, so that, for example, impact strength measured thirty days after manufacture is only a fraction, for instance, half or even less, of the original.

It is known that the impact strength of polypropylene can be increased to a greater or lesser extent by the addition of relatively small quantities, e.g., 5–20%, of rubbery substances such as synthetic rubbers of the butadiene-styrene type, polybutadiene, polyisoprene, butyl rubber and the like. Articles obtained from the rubber-containing mixtures usually also exhibit the phenomenon of loss of impact strength after manufacture, which means that the improvement resulting from the addition of rubber is partly lost after a relatively short time.

It has now been found that the impact strength of shaped articles made from polypropylene or from mixtures predominantly consisting of polypropylene, such as polypropylene with improved impact strength due to the addition of rubber, can be improved or further improved by the application of a comparatively simple treatment.

This treatment consists in exposing the shaped articles to a thermal after-treatment at a temperature between the melting point of the polypropylene and 10° below it for a period sufficient to bring the entire article to the said temperature, after which the article is slowly cooled.

By melting point is here meant the melting point determined optically by the well known birefringence method. This melting point varies between approximately 165° C. and 170° C., depending on the crystallinity of the polypropylene.

The temperature applied during the thermal after-treatment should preferably be not more than 5° C. below the melting point of the polypropylene.

The duration of the thermal after-treatment used according to the invention may vary within wide limits, depending on the nature and dimensions of the article to be treated, the temperature applied and the manner in which the treatment is carried out. In general this period will not be less than 15 seconds or longer than 15 minutes.

A very convenient way of carrying out the thermal treatment is to place the shaped article in a bath containing a high-boiling inert liquid, at the desired temperature. For purposes of this specification, a high boiling inert liquid is defined as a liquid boiling above the melting point of polypropylene and in which there is little or no solution or swelling of polypropylene at the temperature used. The article is kept in the bath for a time sufficient to have it assume the temperature of the bath. Examples of suitable liquids are glycol, glycerol, polyglycols, and high-boiling aliphatic hydrocarbons. When use is made of such liquid baths, a treatment time of one half to two minutes is usually sufficient. In this embodiment the articles to be treated may be simply submerged in the bath or, if desired, they may be passed through the bath continuously or discontinuously by means of a conveyor. The thermal treatment may also be carried out by bringing the articles to be treated to the desired temperature by means of heated air or another inert gas. When this embodiment is used the teatment will generally take longer than when use is made of a liquid bath. The articles are suitably contacted with the heated gas for 5–10 minutes.

In the process according to the invention it is essential that the articles should be slowly cooled after the thermal treatment. This can be effectively done if the articles removed from the thermal treating zone are gradually cooled to room temperature in still air or another inert gas at ambient temperature. The time required for cooling will vary according to the dimensions of the article and may generally be between about 1 and 20 minutes.

Shaped polypropylene articles treated according to the invention have an impact strength which is considerably higher, and frequently even many times higher, than that of the untreated articles. Even in the case of articles manufactured from polypropylene-rubber compositions the treatment results in a considerable increase in impact strength but this increase is generally relatively less than in the case of the articles made from uncompounded polypropylene.

The above-mentioned decrease in impact strength in course of time after manufacture also occurs in articles treated according to the invention, but after the lapse of some time the impact strength continues to be considerably higher than in the case of the untreated articles after the same time has elapsed.

A substantial improvement in low temperature impact resistance, even if temporary, is of practical value. For example, it permits polypropylene pipe to be shipped and handled without damage at low temperatures for a relatively long period between manufacture and installation. After installation, loss of low temperature impact resistance is often of no further consequence.

The benefits of this invention have been demonstrated and require no theoretical explanation. It has been found, however, that there is some observable change in the microstructure of polypropylene on heating to about 2° C. below the melting temperature and thereafter cooling. It is observable under the microscope that the treatment causes the borderlines between spherulites to disappear, resulting in continuous transition between spherulites. It appears that some crystallization takes place in the amorphous regions between spherulites under these conditions.

The fact that product of increased crystallinity, due to treatment according to this invention, is found to have improved impact resistance is surprising, since it is generally found that increased content of amorphous structure leads to increase in impact strength. For example, if a crystallinity as high as that produced by giving rapidly cooled plates a thermal treatment according to this invention is induced by cooling another sample slowly from the melt, at about 5° C. per hour, it is found that the latter sample has extremely low impact resistance at 0° C. and may even be brittle at room temperature.

In the process according to the invention it was found advantageous to apply the thermal treatment to articles cooled to temperatures below room temperature, for instance between −20 and +10° C., during the last stage of the shaping process. In the case of articles manufactured in a mold, for instance, by injection molding, this can be done by externally cooling the mold in which the plastic material is introduced to below room temperature. The impact strength of such articles after the thermal treatment is higher than in the case of articles to which these low temperatures were not applied.

When the process according to the invention is applied to extruded piping, not only is the impact strength considerably increased, particularly at low temperatures, but the bursting pressure is also raised, which increases the pipe life when the pipe is subject to the internal pressure during use.

The articles of this invention are most suitably produced from polypropylene which is obtained by polymerizing propylene with a highly stereospecific catalyst system. A great variety of stereospecific catalysts have been described in the literature. Known effective catalysts are species or modification of the so-called Ziegler catalyst; that catalyst consists broadly of two-component systems comprising a compound of the Group 4b, 5b, 6b, or 8 of the Periodic Table of the Elements, as illustrated on pages 448 and 449, Handbook of Chemistry and Physics, The Chemical Rubber Publishing Corp., 44th Edition, 1962, and a Group 1a, 2a or 3a element or alloy or hydride or organic derivative having an organometallic bond. Suitable catalysts are described in the reference listed on pages 350–361 of "Linear and Stereoregular Addition Polymers" by Gaylord and Mark, Interscience Publishers, Inc., New York (1959). Since stereoregular polypropylenes are now well known materials of commerce, their preparation need not be further described here. The common stereoregular form of polypropylene is that known as isotactic.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. In general, polypropylene having a crystallinity of this order contains at most only a very small proportion of atactic material, which is extractable in hydrocarbons such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement which enables them to solidify from a melt in a highly crystalline structure.

In addition to any added rubbery substances, minor amounts of other additives such as conventional antioxidants, light stabilizers, crystallization control additives, fillers, pigments and the like may also be incorporated into the polypropylene from which the articles to be treated according to the invention are manufactured.

For purposes of definition "shaped articles consisting essentially of crystalline polypropylene" will refer to articles having a thickness of at least about 0.5 mm., made of a material which is at least to the extent of 80% by weight a stereoregular homopolymer of propylene having a crystallinity of at least about 50% as determined by X-ray of similar means and which has the spherulitic crystallization characteristics of isotactic polypropylene. The invention applies to articles made from polypropylene having intrinsic viscosity (measured in Decalin at 150° C.) between 2 and 10 dl./g. or higher, and is increasingly more effective at the higher I.V. values.

The process according to the invention and the important effect achieved by it will be further illustrated by the following examples. The polypropylenes used in these examples were prepared by polymerization of propylene with the aid of a mixture of gamma titanium trichloride and aluminum diethyl chloride as catalyst. The melt indices given in the examples were determined at 250° C. with a load of 2.16 kg., and the intrinsic viscosities in Decalin at 150° C.

Example I

Pipes were used with an outside diameter of 25 mm. and a wall thickness of 2.3 mm., respectively manufactured by a conventional extrusion process from (a) polypropylene with a melt index of 0.29 and an intrinsic viscosity (I.V.) of 4.5, and (b) polypropylene with a melt index of 0.08 and an I.V. of 6.1.

Directly after manufacture, some of these pipes were subjected to a thermal after-treatment by placing them in a glycol bath heated to 166° C.±2° C. for 1 minute, after which they were taken out of the bath and allowed to cool slowly in the air to about 20° C.

The impact strength of both the treated and untreated pipes was determined at 0° C., i.e., that of a number of pipes after one day and that of others after 30 days. This evaluation was made according to the Charpy method by measuring the energy expended (expressed in kg.) to produce 50% fracture when testing a number of pipes. The results obtained are given in Table I below, in which column A refers to the untreated pipes and column B to the treated ones.

TABLE I

| Tube Material | Energy in kg, for 50% Fracture | | | |
|---|---|---|---|---|
| | After 1 Day | | After 30 Days | |
| | A | B | A | B |
| Polypropylene (I.V. 4.5) | 1.3 | 3.5 | 1.2 | 2.4 |
| Polypropylene (I.V. 6.1) | 2 | 12 | 1.1 | 6.5 |

When the thermal treatment was carried out by heating the pipes for 10 minutes to 166° C. with heated air the results were substantially the same.

Example II

Bottles with a capacity of 475 cc. and a wall thickness of approximately 0.5 mm. were blown on a Fischer bottle-blowing machine, using respectively (a) polypropylene with a melt index of 0.26 and an I.V. of 4.8, (b) the same polypropylene intimately blended with 10% w. of butyl rubber, and (c) polypropylene with a melt index of 0.77 and an I.V. of 3.6.

Some of the bottles were then given the thermal after-treatment of the invention by heating them to 168° C. for 3 minutes in air in an oven and then allowing them to cool slowly in the air.

The impact strength of the treated and untreated bottles was determined at 0° C. after varying periods. To this end the bottles were filled with water of 0° C., after which they were sealed with a screw cap and dropped bottom downward from a certain height onto a horizontal stone surface; the height was then measured at which 50% failure occurred. The results obtained are given in Table II in which column A refers to the untreated bottles and column B to the treated ones. Each evaluation is based on dropping tests to which batches of 10 bottles were subjected.

TABLE II

| Material of the Bottles | Height of Drop (in cm.) For 50% Failure | | | | | | | | | |
|---|---|---|---|---|---|---|---|---|---|---|
| | After 2 hours | | 14 days | | 30 days | | 90 days | | 180 day | |
| | A | B | A | B | A | B | A | B | A | B |
| Polypropylene (I.V. 4.8) | 35 | 135 | 33 | 90 | 35 | 95 | 40 | 90 | 35 | 80 |
| Polypropylene (I.V. 4.8) +10% butyl rubber | 88 | 163 | 56 | 105 | 77 | 104 | 68 | 96 | 75 | 135 |
| Polypropylene (I.V. 3.6) | 30 | 72 | 35 | 62 | 37 | 66 | | | | |

Example III

Using an apparatus of a known type for the manufacture of dishes by injection molding of thermoplastic material, dishes were produced (diameter 19.2 cm.; thickness approximately 2.4 mm.) from two polypropylenes of injection molding quality with I.V.'s of 2.5 and 2.8 respectively and also from the same two polypropylenes with 0.3% w. of p-tert-butyl-benzoic acid (p.t.b.b.a.) added as a crystallization control additive. The temperature of the mold into which the molten starting material was injected was varied, being 50° C., 20° C. or 7° C. Some of the dishes were given a thermal after-treatment according to the invention by heating them for 5 minutes at about 168° C. in air atmosphere in an oven and then allowing them to cool in the air. The impact strength of the treated and the untreated dishes was determined at 20° C. after various periods varying from 2 hours to 3 months after manufacture or after treatment respectively. The impact strength was determined by dropping a steel ball, weight 2.7 kg. from a given height (max. 59 cm.) onto the horizontal dish, and then measuring the height at which a fracture occurred in the dish. The average of five measurements was taken in each case as a measure of the impact strength. The results are given in Table III below.

The data in Table III not only shows clearly the improvement achieved in impact strength by means of the thermal after-treatment, but also the favorable effect of cooling the mold used for the injection molding to below room temperature, in which case the improvement effected by the after-treatment is retained appreciably better, even after longer periods.

We claim as our invention:

1. A process for the improvement of the impact strength of shaped articles which are at least 0.5 mm. in thickness and consist essentially of crystalline polypropylene, comprising the steps of heating the shaped article, without connecting it to the melt state, at a temperature between the melting point of the polypropylene and 10° C. below it for a period sufficient to bring the entire article to the desired temperature and not exceeding 15 minutes at said temperature, and thereafter permitting the article to cool at a rate equivalent to cooling in a still gaseous atmosphere at room temperature.

2. A process according to claim 1, wherein said article is heated to a temperature which is not more than 5° C. below the melting point of the polypropylene.

3. A process according to claim 1 wherein said heating is carried out by immersing the shaped article in a heated bath of high-boiling inert liquid in which there is substantially no solution or swelling of polypropylene at the temperature used.

4. A process according to claim 3 wherein the high-boiling inert liquid is glycol.

5. A process according to claim 1 wherein said heating is carried out by bringing the shaped article to the desired temperature by means of heated inert gas.

6. A process according to claim 5 in which said gas is air.

7. A process according to claim 1 wherein said article being treated is one that has been cooled to below room temperature during the last stage of its shaping process.

TABLE III

| | Average Height of Drop (cm.) | | | | | | | | | | | | | | | |
|---|---|---|---|---|---|---|---|---|---|---|---|---|---|---|---|---|
| Injection time (sec.) | 20 | | | | 10 | | | | 10 | | | | 10 | | | |
| Mold temperature, (° C.) | 50 | | | | 50 | | | | 20 | | | | 7 | | | |
| Time after molding treatment or after-treatment | a | b | c | d | a | b | c | d | a | b | c | d | a | b | c | d |
| Polypropylene (I.V. 2.5) | | | | | | | | | | | | | | | | |
| u | 14 | 7 | 7 | 2 | 17 | 6 | 4 | 3 | 12 | 6 | 4 | 3 | 20 | 5 | 7 | |
| t | >56 | 35 | 33 | 26 | >58 | 38 | 35 | 33 | >58 | 51 | 46 | 38 | >59 | >59 | >59 | |
| Polypropylene (I.V. 2.5)+0.3%p.t.b.b.a. | | | | | | | | | | | | | | | | |
| u | 31 | 8 | 7 | 4 | 37 | 14 | 10 | 11 | 14 | 7 | 4 | 4 | 28 | 15 | 9 | |
| t | >59 | 39 | 38 | 35 | 57 | 41 | 40 | 33 | >56 | 46 | 47 | 36 | >58 | >58 | 51 | |
| Polypropylene (I.V. 2.8) | | | | | | | | | | | | | | | | |
| u | 18 | 12 | 7 | 4 | >41 | 26 | 13 | 13 | >51 | 31 | 10 | 10 | 55 | 40 | 36 | |
| t | 58 | 52 | 39 | 24 | 56 | 54 | 44 | 42 | 57 | 55 | >52 | >50 | >59 | >59 | >59 | |
| Polypropylene (I.V. 2.8)+0.3% p.t.b.b.a. | | | | | | | | | | | | | | | | |
| u | 16 | 5 | 5 | 2 | 35 | 25 | 13 | 13 | >59 | 25 | 6 | 4 | 40 | 32 | 27 | |
| t | >56 | 40 | 23 | 28 | >58 | 42 | 41 | 30 | >59 | 52 | 50 | 38 | >57 | >58 | >57 | |

In this table, $u$ denotes untreated and $t$ treated and the period a=2 hours, b=14 days, c=1 month, d=3 months.

References Cited

UNITED STATES PATENTS 2,990,580   7/1961   Foster _____ 264—346

OTHER REFERENCES

Mandelker et al.: "J. Appl. Phys.," 1961, volume 32, pp. 1513–14.

Farrow: "Polymer," London, 1961, vol. 2, p. 409, p. 415 relied upon.

"Propathene, Brand of Polypropylene," International Chemical Industries Ltd., p. 7 relied on.

Farrow: "Polymer," London, vol. 4, No. 2, pp. 191–7, June 1963.

JOSEPH L. SCHOFER, *Primary Examiner.*

JAMES A. SEIDLECK, *Examiner.*

L. EDELMAN, *Assistant Examiner.*